Nov. 29, 1960 — D. L. MORSE — 2,962,317
MAGNETIC NUT
Filed Feb. 4, 1959
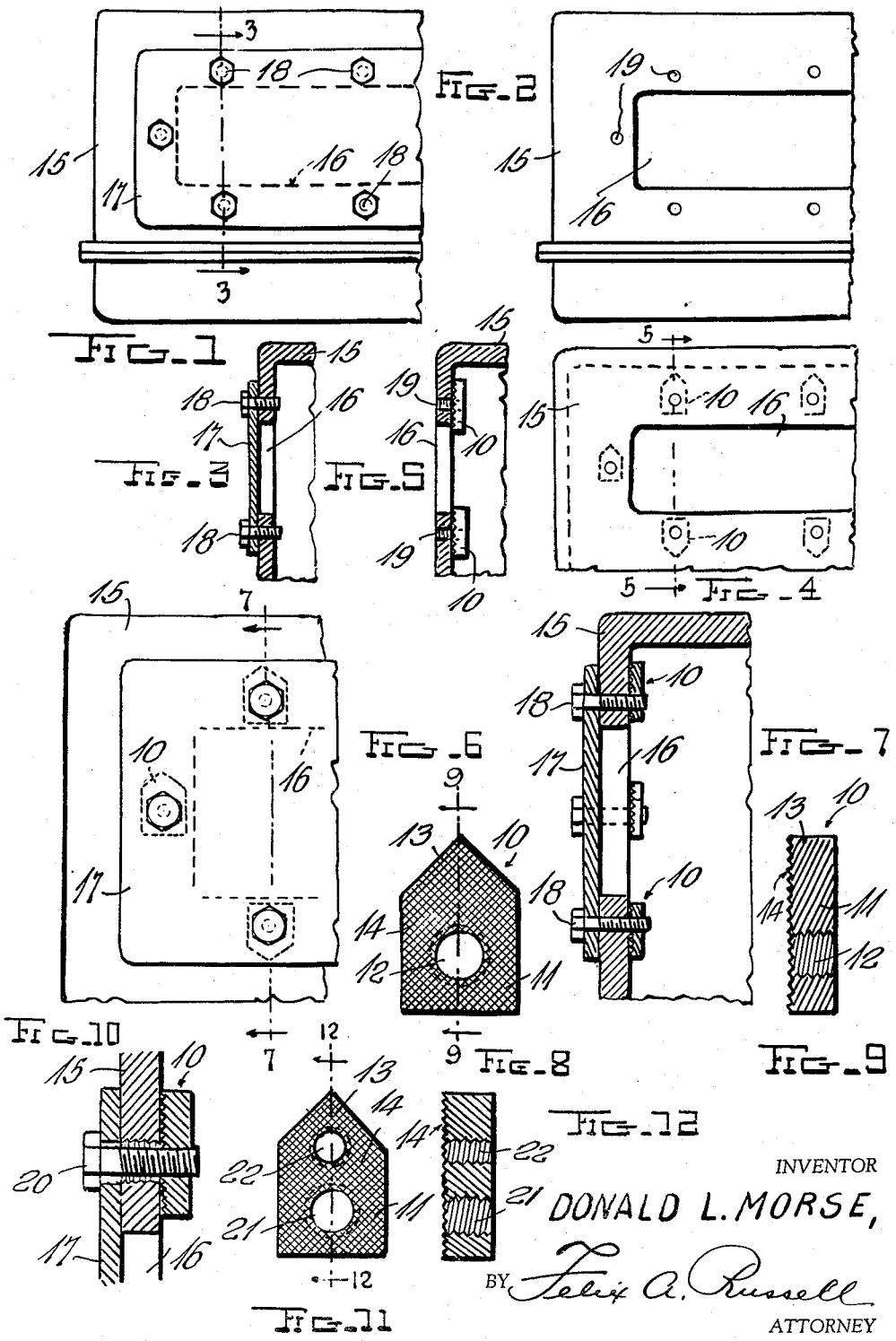
INVENTOR
DONALD L. MORSE,
BY Felix A. Russell
ATTORNEY

United States Patent Office 2,962,317
Patented Nov. 29, 1960

2,962,317

MAGNETIC NUT

Donald L. Morse, Phippsburg, Maine
(Star Rte. 3, Bath, Maine)

Filed Feb. 4, 1959, Ser. No. 791,209

3 Claims. (Cl. 292—251)

The present invention relates to a magnetic nut and it consists in the combinations, constructions and arrangements of parts herein described and claimed.

Generally there is provided a nut having a preferably rectangular body with an integrally formed projection at one end portion thereof and with one or more threaded openings extending therethrough. One face of the nut is roughened or knurled.

The device is such that it may be used in places where it is normally impossible to manually position and hold a nut while starting a screw into the same. Likewise, it is capable of use in repair jobs where a casting, for example, is no longer capable of receiving screws. One such instance is shown and described hereinbelow by way of illustration of the invention. The roughened or knurled face assists in maintaining the nut in a given position while a screw is being started therein while the projection is designed to abut against any obstructions which may be in its path to likewise assist in holding the nut in position during the starting of a screw or bolt therein.

It is accordingly an object of the invention to provide a nut of the character set forth having self-contained means for maintaining itself in given positions.

Another object of the invention is to provide a nut of the character set forth which is simple in construction, inexpensive to manufacture and yet effective and efficient in use.

A further object of the invention is to provide a nut which is permanently magnetized.

Other and further objects of the invention will become apparent from a reading of the following specification taken in conjunction with the drawing, in which:

Figure 1 is a fragmentary elevational view of a motor block provided with a cover plate;

Figure 2 is a view similar to Figure 1 but with the cover plate removed;

Figure 3 is a fragmentary sectional view taken along line 3—3 of Figure 1;

Figure 4 is a fragmentary elevational view similar to Figure 2 but showing a plurality of the nuts of the present invention positioned thereon, such nuts being shown in dotted lines;

Figure 5 is a fragmentary sectional view taken along line 5—5 of Figure 4;

Figure 6 is an enlarged fragmentary elevational view similar to Figure 1 but showing the cover plate replaced and held in position by a plurality of the nuts of the present invention;

Figure 7 is a fragmentary sectional view taken along line 7—7 of Figure 6;

Figure 8 is an elevational view of a nut in accordance with the present invention;

Figure 9 is a sectional view taken along line 9—9 of Figure 8;

Figure 10 is a fragmentary sectional view illustrating one manner in which the present invention may be used where a previously threaded opening for a screw has become entirely useless;

Figure 11 is a view similar to Figure 8 but showing a modified form the invention may assume; and Figure 12 is a sectional view taken along line 12—12 of Figure 11.

Referring more particularly to the drawing, there is shown therein, particularly in Figures 6 and 7, the preferred form of the invention in which there is provided a nut generally indicated at 10 and having a rectangular body 11 centrally provided with a threaded opening 12 and having an integrally formed projection 13 extending from one end portion thereof. One of the larger faces of the nut 10 is knurled or roughened, as indicated at 14.

One of the unique uses to which the nut of the present invention may be put is illustrated in Figures 1 to 7, inclusive, wherein there is shown a motor block 15 having the conventional opening 16 over which a cover plate 17 is affixed by metal screws 18 threaded through the peripheral portion thereof and into the block 15 at the marginal portion thereof adjacent the opening 16, threaded openings 19 being provided in the block 15 for the reception of the screws 18. A gasket (not shown) is normally interposed between the marginal portions of the plate 17 and the block 15. It will be apparent that no nuts are used nor are any necessary when the cover plate 17 is first assembled upon the block 15.

In the course of time and use, the gasket deteriorates and requires replacement and it becomes necessary to remove the plate 17 to accomplish this. Quite often, when this is done, it is found that the screws 18 will break and it is then necessary to drill out the embedded portions of the same and thereafter rethread the openings 19 for larger new screws. Since the openings 19 are perforce close to the edge of the opening 16, such enlarging of the holes 19 often weakens or renders useless the block 15.

With the use of the present invention, all that is necessary is to position one of the nuts 10 upon the inner wall of the block 15 adjacent each of the openings 19 with its threaded opening 12 in registry therewith and with its knurled or roughened face 14 against such inner wall. The screws 18 may then be reinserted through the plate 17 and threaded through the block 15 and the nut 10 to thus firmly resecure the cover plate in proper position over the opening 16, a new gasket being placed in proper position during this action, of course. It will be seen that the magnetism of the nut 10 will hold the same in whatever position it is placed in and that, when the screw 18 begins to enter the threaded opening 12, any tendency of the nut to move therewith will be overcome by the friction set up between the roughened or knurled face 14 and the wall of the block 15 with which it is in contact. As a further provision against such turning, the projection 13 has been provided and it is designed to come into contact with any obstruction in its path to thus prevent any further rotation of the nut 10.

In Figure 10, the nut 10 has been provided with a relatively smaller threaded opening 12 than the diameter of its respective opening 19. Hence a screw or bolt 20 of smaller diameter may be used. In this case it will be apparent that there will be little or no frictional contact between the screw 20 and the openings in the plate 17 and block 15, thus ensuring relative ease in starting the screw 20 into the nut 10. It will also be seen that in this arrangement, the plate 17 is held in its operative position upon the block 15 by the screws 20 and nuts 10 alone and without any reliance upon the threading of screws into the weakened and possibly corroded block 15.

In that form of the invention illustrated in Figures 11 and 12, the nut 10 has been provided with a plurality of threaded openings, two of such openings 21 and 22, being shown by way of illustration, the additional opening or openings being, of course, for the purpose of receiving additional screws under conditions as outlined above with the preferred form of the invention.

While but two forms of the invention have been shown and described herein, it will be readily apparent to those skilled in the art that many minor modifications may be made without departing from the spirit of the invention or the scope of the appended claims.

What is claimed is:

1. In a container of magnetizable metal having a closure opening and a closure plate for said closure opening, said container having threaded openings therein adjacent said closure opening, and said plate having openings therein registerable with said threaded openings in said container, the improvement comprising: means for fastening said plate to said container, said means comprising a plurality of nuts each formed of magnetized material and having a threaded opening therethrough of smaller diameter than said openings in said container and plate, and a screw for each of said nuts each extensible through a pair of said registered openings, said nuts being positioned upon the inner wall of said container and each threadably receiving one of said screws, said nuts each provided with a roughened face abutting the wall of said container, whereby when the threads in said container openings become so damaged from misuse or repeated use as not to hold screws of the size originally screwed therein, said fastening means may be substituted therefor.

2. Structure according to claim 1, said nuts each having a second threaded opening therethrough, parallel to and spaced from said first-mentioned threaded opening, said second threaded opening being sized and threaded for receiving and holding a screw matching the original screw for anchoring said closure plate, whereby if the original threads in said container openings are fully stripped away or reamed out, said second-mentioned threaded opening in said nut can be employed in cooperation with original or matching screws.

3. Structure according to claim 2, said nut being elongated in the direction of a line passing substantially through and perpendicular to the axes of the threaded openings therein, whereby the portions located eccentrically of each opening will serve as a lever-like extension for lockingly resisting turning of said nut by and around a cooperating screw.

References Cited in the file of this patent

UNITED STATES PATENTS

| | | |
|---|---|---|
| 893,965 | Wootton | July 21, 1908 |
| 976,569 | Horrocks | Nov. 22, 1910 |
| 1,344,456 | Schroeder | June 22, 1920 |
| 1,624,741 | Leppke et al. | Apr. 12, 1927 |
| 1,641,880 | Cohen | Sept. 6, 1927 |
| 2,073,875 | Neff | Mar. 16, 1937 |
| 2,623,399 | Barrett | Dec. 30, 1952 |

OTHER REFERENCES

Applied Magnetics, March 1954, vol. 2, No. 2. (A six page pamphlet published by The Indiana Steel Products Co.)